Figure 1:
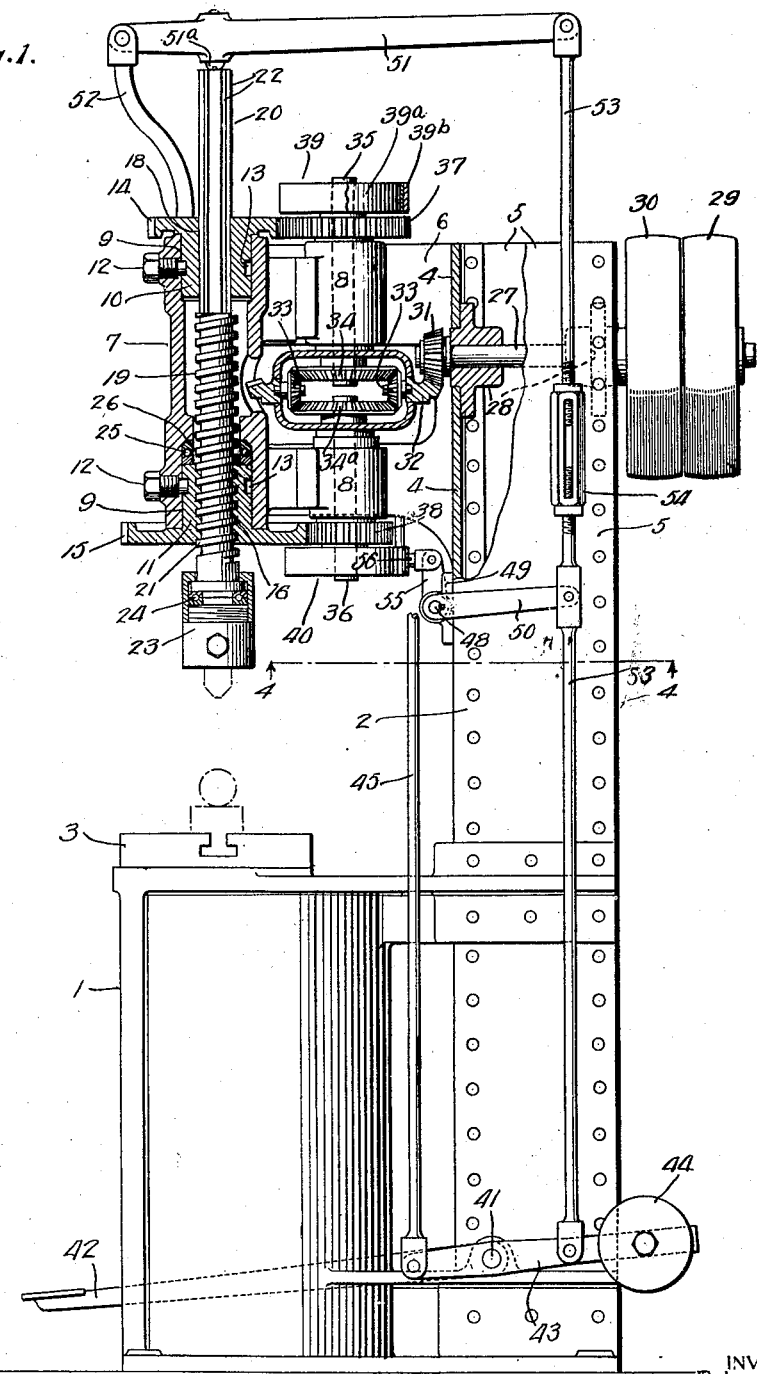

Nov. 11, 1930. R. THOMSON ET AL 1,781,038
POWER PRESS
Filed Dec. 21, 1927 3 Sheets-Sheet 1

INVENTORS
Robert Thomson
Alfred Morris Thomson
BY
Daniel Davis
ATTORNEYS

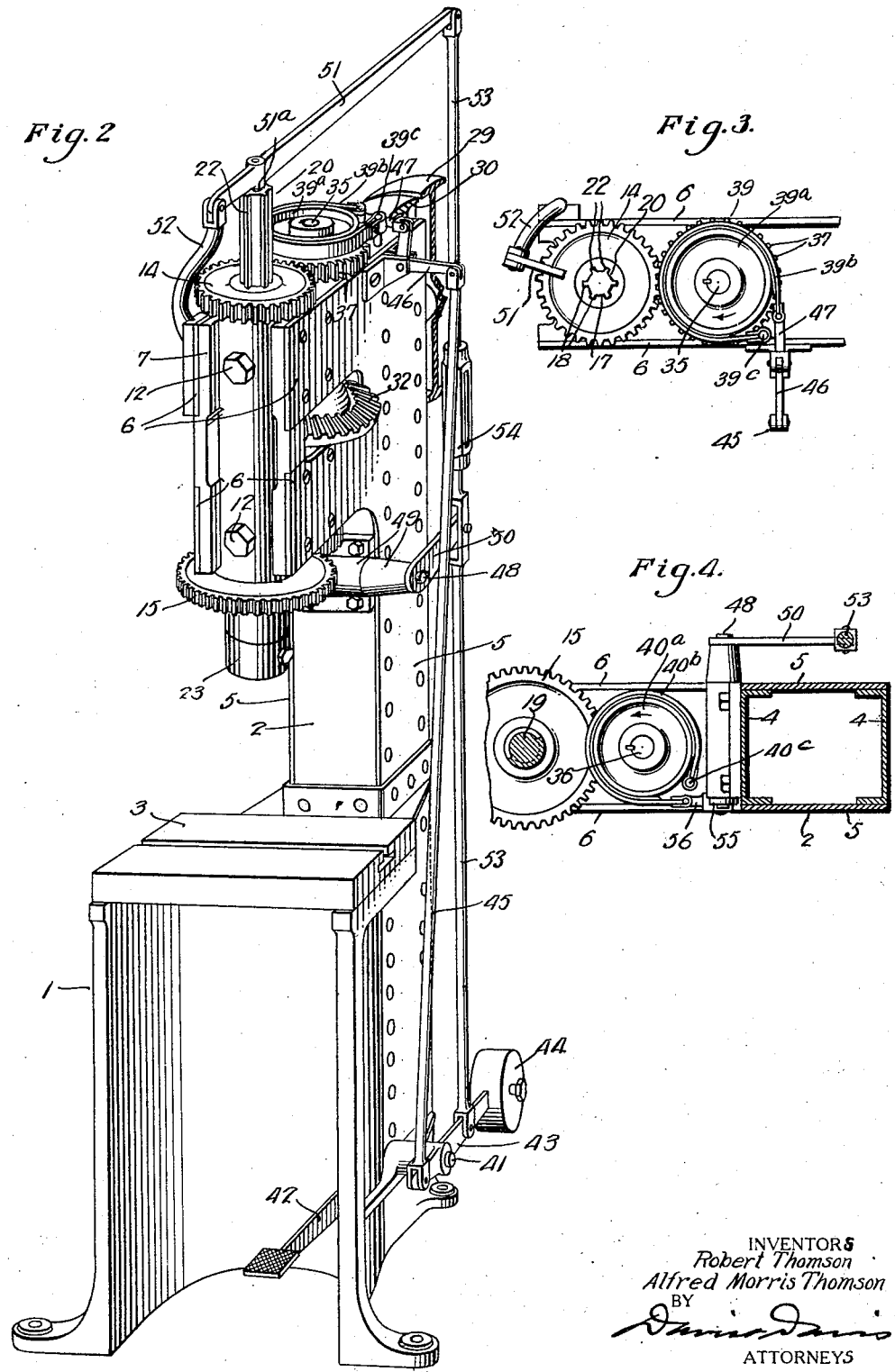

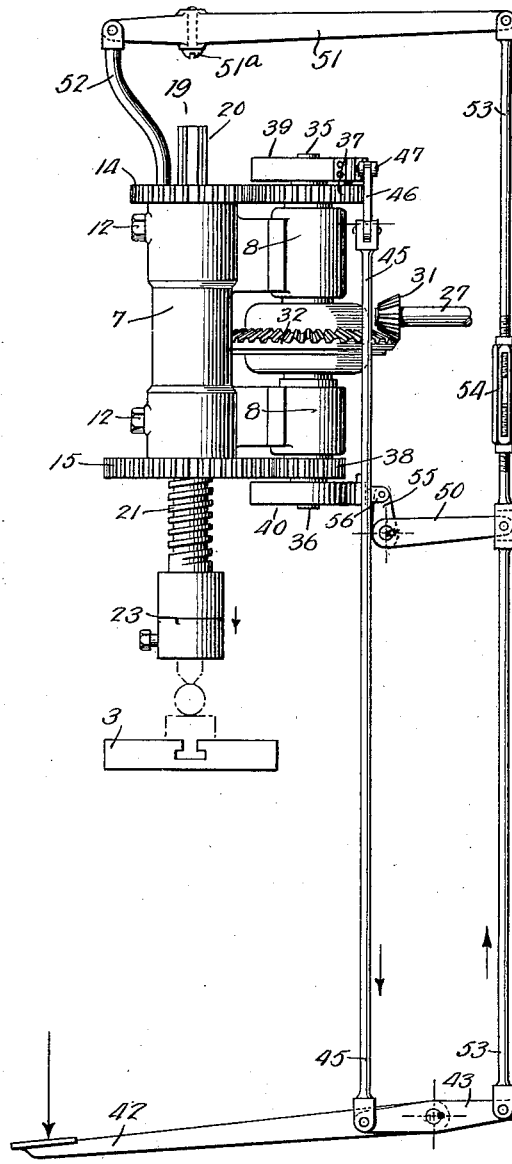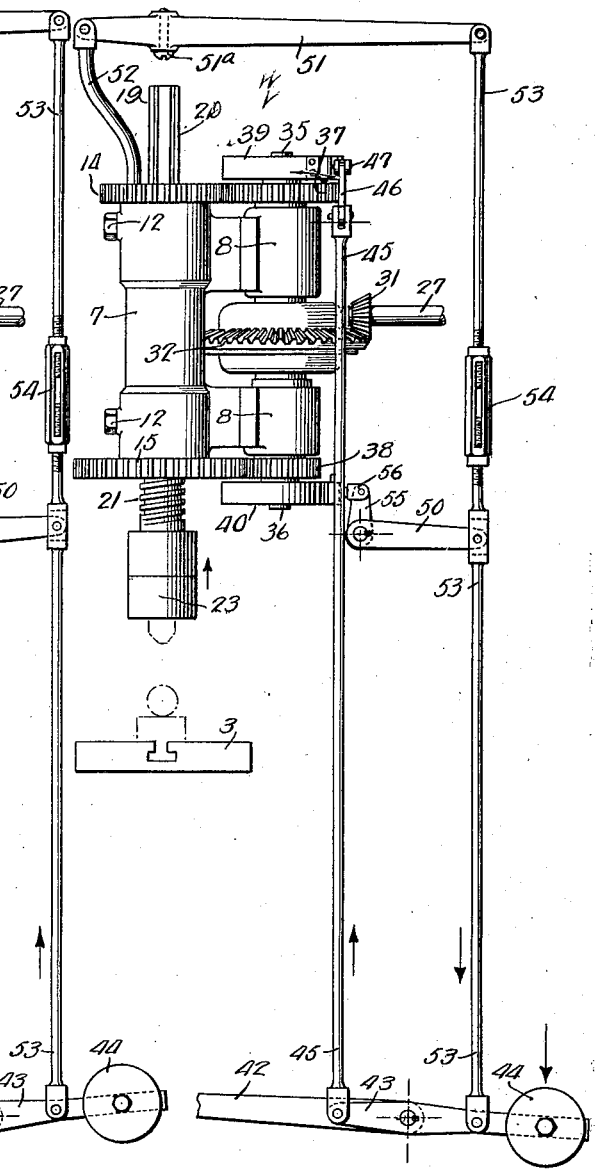

Patented Nov. 11, 1930

1,781,038

UNITED STATES PATENT OFFICE

ROBERT THOMSON AND ALFRED MORRIS THOMSON, OF NEWARK, NEW JERSEY

POWER PRESS

Application filed December 21, 1927. Serial No. 241,555.

An important object of the present invention is to provide improved means for driving the ram of a power press and controlling its movements. The invention relates particularly to a press of the "flexible" power type. In such a press the pressure of the ram is under the control of the operator and may be varied at will during the working stroke of the ram, according to the requirements of the work which is being performed.

Another important object of the invention is to provide improved means for moving the ram upon its return stroke and for automatically controlling said return movements in a manner to prevent shock and injury to the press structure.

Other objects of the invention will appear hereinafter.

In the drawings:

Fig. 1 is a side elevation partly in section of a power press embodying my invention;

Fig. 2 a perspective view of the press;

Fig. 3 a top plan view of the upper friction brake;

Fig. 4 a section taken on the line 4—4 of Fig. 1;

Fig. 5 a diagrammatic view of the press operated for a working stroke of the ram; and Fig. 6 a diagrammatic view of the press operated for a return stroke of the ram.

Referring by numerals to the various parts, the press includes a frame structure comprising a base 1 and a column 2 rigidly secured to the base at the rear of the latter. The forward portion of the base forms a support for a work table 3, which is provided with the usual slot for holding a suitable work support. The column structure is hollow, being formed by front and rear upstanding channel irons 4 and side plates 5 secured to the channel irons and also to the base. The side plates extend forward to form spaced arms 6 disposed above the work table 3. Secured between the outer ends of the arms 6 and in vertical alinement with the center of the table 3, is a hollow bearing block 7 for shiftably supporting the press ram. Two bearings 8 are mounted upon the rear side of the bearing block 7. These bearings are located between the arms 6 and are vertically spaced apart.

Within its upper and lower ends the bearing block 7 is formed with cylindrical bearing surfaces 9 whose centers are in vertical alinement. A bushing 10 is mounted to turn within the upper bearing surface, and a bushing 11 is mounted to turn within the lower bearing surface. Screws 12 are screwed into the front of the bearing block and extend into peripheral grooves 13 formed in the two bushings. These screws hold the bushings against endwise displacement but permit them to rotate freely in the bearing block. The upper bushing 10 has a gear wheel 14 formed upon it above the upper end of the bearing block; and formed upon the lower bushing is a gear wheel 15 below the lower end of the block 7. The lower bushing is internally threaded as at 16 and the upper bushing is formed with a central bore 17 in which are grooves or key ways 18.

The bushings 10 and 11 support the press-ram 19. This ram comprises an elongated shank 20 which is threaded as at 21 from a point adjacent its lower end upwardly for substantially half its length. Above its threaded portion the shank 20 is reduced in cross-section and formed with longitudinally extending ribs or splines 22. The lower end of the shank is enlarged and has a tool head 23 swiveled upon it. The tool head is provided with the usual socket to receive a tool shank, and with a set screw to hold the latter in a socket. A ball bearing 24 is interposed between the lower end of the shank 20 and the tool head so that said parts may turn freely relatively to each other even when subjected to pressure. The threaded lower portion of the ram is threaded through the lower bushing 11 and its reduced upper portion passes through the upper bushing 10. The reduced portion has a longitudinal sliding fit within the upper bushing and the latter is locked to rotate with the ram by engagement of the splines 22 in the keyways 18. A ball bearing 25 is interposed between the upper end of the bushing 11 and an abutment 26 formed in the bearing block, to receive an endwise upward thrust transmitted to said bushing by the ram.

Rearwardly of the bearing block a horizontal disposed drive shaft 27 extends through the column 2 and is mounted to rotate in bearings 28 secured to the front and rear walls of the column. A fixed belt pulley 29 and a loose pulley 30 are mounted upon the shaft 27 back of the column, and a bevel drive pinion 31 is fixed to the forward end of the shaft. The pinion 31 has driving connections with the ram supporting bushings 10 and 11 through a differential gear mechanism which is located in the space between the bearings 8. This mechanism includes an outer bevel gear 32 which meshes with the driver pinion 31. The gear 32 is in the form of a ring and carries two stub shafts which extend radially inward at diametrically opposite points and have intermediate bevel pinions 33 mounted to rotate upon them. A bevel follower gear 34 meshes with the upper sides of the pinions 33 and is fixed to the lower end of a shaft 35 which extends upward and is mounted to rotate in the upper bearing 8. A similar bevel follower gear $34^a$ meshes with the lower sides of the pinions 33 and is fixed to the upper end of a shaft 36 which extends downward and is mounted to rotate in the lower bearing 8.

The upper shaft 35 extends above its bearing and has a positive driving connection with the upper bushing 10 through a gear 37 which is fixed to the shaft and meshes with the bushing gear 14. In the present instance these two gears are of the same size. The lower shaft 36 extends below its bearing and has a gear 38 fixed to it and meshing with the bushing gear 15 for driving the lower bushing 11. In the present instance the lower bushing gear 15 is larger than the upper gear 14 and is twice the diameter of its driving gear 38.

The rotation of the upper shaft 35 is controlled by a friction brake 39 and the rotation of the lower shaft 36 is controlled by a friction brake 40. The upper brake 39 comprises a brake drum $39^a$ fixed to the shaft 35, and a contracting brake band $39^b$ encircling the drum, provided with a friction lining and anchored at one end as at $39^c$ to the press frame. Similarly the lower brake 40 comprises a brake drum $40^a$ fixed to the shaft 36, and a contracting band $40^b$ provided with a friction lining and anchored at one end to the press frame as at $40^c$.

Rotatably supported by the base of the press frame is a horizontal rock shaft 41; and fixed to said shaft is a treadle 42 which extends forwardly to a point in front of the base. The shaft 41 extends out beyond one side of the base and has a lever 43 fixed to it and extending forwardly and rearwardly therefrom. Mounted upon the rear end of the lever 43 for longitudinal adjustment thereon is a weight 44. A reach rod 45 is pivotally connected to the forward end of the lever 43 and extends upward to a point adjacent the upper end of the press frame, said upper end being pivotally connected to the outwardly extending arm of a bell crank lever 46. The lever 46 is pivotally mounted upon the side of the frame and has an upwardly extending arm. A pull rod 47 operatively connects the upper end of this arm to the free end of the brake band $39^b$.

A rock shaft 48 is rotatably mounted in a bearing 49 secured upon the front of the column 2 and adjacent the lower brake 40. Fixed to one end of the shaft 48 is a rearwardly extending crank arm 50 located outwardly from the press frame and upon the same side thereof as the lever 43. A lever 51 is pivoted at the one end to a bracket arm 52 which is secured to the forward end of one of the frame arms 6 and extends a material distance above the frame. From its point of attachment to the bracket arm the lever 51 extends rearwardly, across the upper end of the press ram, to a point in vertical alinement with the rear end of the crank arm 50. A vertical reach rod 53 is pivotally connected to the lever 43 at a point between the rock shaft 41 and the weight 44. This rod extends upward and is operatively connected to the crank arm 50 and to the rear end of the lever 51. The rod 53 is made in sections which are threaded and connected together above the crank arm 50 by a turnbuckle 54 to provide for the adjustment of the length of the rod between the crank arm and the lever 51, and the proper positioning of the latter with relation to the upper end of the ram, for a purpose which will presently appear. Fixed to the rock shaft 48, at the opposite end thereof from the crank arm 50, is a crank arm 55 which extends upwardly and has an operative connection 56 with the free end of the brake band $40^b$ of the lower brake 40.

Assuming that the driving power is applied to the main drive shaft 27 and that the ram is elevated, the press is operated by applying foot pressure to the treadle 42 to rock the shaft 41 and its connected lever 43 against the resistance of the weight 44. The forward end of said lever then exerts a downward pull upon the reach rod 45 and rocks the bell crank lever 46 to contract the brake band $39^b$ about the drum $39^a$ for brake application of greater or less degree dependent upon the amount of pressure applied to the treadle. The rocking of the lever 43 by foot pressure also causes an upward thrust to be transmitted through the reach rod 53 to the crank arm 50. The crank arm 50, the rock shaft 48 and the crank arm 55 are thereby rocked to expand the brake band $40^b$ and release the lower brake 40. Thus there is a frictional resistance applied to the shaft 35, leading upward from the differential which tends to hold the shaft, the gear 37, the gear 14 and the upper bushing 10 against rotation. The lower brake 40, is, however, released so that the power from the main drive shaft 27 is transmitted through the differential and the shaft 36 to rotate the gear 38, the gear 15 and the lower threaded bushing 11. Since the upper bushing 10 is held against rotation, the engagement thereof with the splined portion of the ram will hold the latter against rotation. Therefore the rotation of the threaded bushing 11 will cause an endwise movement of the ram, and the upper portion thereof will slide through the bushing 10. The relationship between the threads 21 of the ram and the direction of rotation of the drive shaft 27 is such as to cause the ram to descend toward the work table.

When the ram has brought the tool into contact with the work its pressure may be varied to suit the requirements by varying the pressure upon the treadle 42. A relatively light pressure upon the treadle will cause only a light application of the upper brake and will permit the brake drum 39ª to slip when the desired light pressure has been applied through the tool in the head 23, thereby stopping the downward feed movement of the ram. The application of sufficient pressure to the treadle 42 to strongly apply the brake 39 and positively hold the shaft 35, the bushing 10 and the ram against any rotation will give the threading bushing 11 its maximum feeding power and cause a powerful pressure upon the work. Many different degrees of pressure are obtainable by merely varying the pressure upon the treadle. This gives the press maximum power flexibility.

To cause the retraction of the ram from the work the operator merely removes his foot from the treadle. The weight 44 then rocks the lever 43 to exert an upward thrust upon the reach rod 45 and a downward pull upon the rod 53 to automatically release the upper brake 39 and apply the lower brake 40. The application of the lower brake causes the threaded bushing to be held against rotation while the release of the upper brake permits the bushing 10 to be turned freely by the power from the shaft 27 received through the differential, the shaft 35 and the gears 37, and 14. The rotation of the bushing 10 causes the ram to rotate and screw upwardly through the held bushing 11, the upper portion of the ram sliding through its driving bushing 10. The gears 37 and 14 are of the same size so that the ram will be rotated at the same speed as the shaft 35 and will be rapidly retracted.

It is most desirable that the return movement of the ram be limited in a manner to avoid shock to the press. In the present apparatus I have provided for an automatic cut-off of the return driving power from the ram when the latter reaches a certain point in its return stroke. The lever 51 extends across the path of movement of the ram and is provided with an abutment member 51ª which is in a position to be struck by the upper end of the ram. By means of the turnbuckle 54 the position of the lever 51 is adjusted so that the ram will contact with the abutment 51ª near the upper end of its stroke. When this contact has been made and the ram continues its upward movement the lever 51 is rocked upwardly thereby exerting a pull upon the reach rod 53 which rocks the lower lever 43 against the resistance of the weight 44 and also rocks the crank arm 50 to release the lower brake 40. This movement of the lower lever 43 exerts a pull through the reach rod 45 which rocks the bell crank 46 to apply the upper brake 39. The application of the brake 39 stops the rotation of the shaft 35, the gear 37 and the bushing 10 and halts the upward movement of the ram. The ram is thus automatically stopped without impact and without shock to the press structure.

What we claim is:

1. In a power press, a shiftably mounted ram; a differential gear mechanism; a drive element operatively connected to said mechanism; a driving connection between one side of the differential mechanism and said ram to move the latter on a working stroke; a driving connection between the opposite side of the differential mechanism and the ram to move the ram on a return stroke; means to control the movements of the ram; and automatic means to render said return driving connection inoperative and limit the extent of the return stroke of the ram.

2. In a power press, a shiftably mounted ram; a differential gear mechanism; means to drive said mechanism; a driving connection between the differential mechanism and the ram to move the latter on a working stroke; a driving connection between said mechanism and the ram to move the latter upon a return stroke; automatic means to render said return driving connection inoperative and limit the extent of the return stroke of the ram; and means operable at will to vary the pressure of the ram on its working stroke.

3. In a power press, a shiftably mounted ram; a differential gear mechanism; a drive element operatively connected to said mechanism; a driving connection between one side of the differential mechanism and said ram to move the latter on a working stroke; a driving connection between the opposite side of the differential mechanism and the ram to move said ram on a return stroke; a brake to control said working stroke driving connection; a brake to control said return stroke driving connection; and means to alternately operate said brakes for controlling the movements of the ram.

4. In a power press, a shiftably mounted ram; a differential gear mechanism; a drive element operatively connected to said mechanism; a driving connection between one side of the differential mechanism and said ram to move the latter on a working stroke; a driving connection between the opposite side of the differential mechanism and the ram to move said ram on a return stroke; a brake to control said working stroke driving connection; a brake to control said return stroke driving mechanism; means to operate said brakes at will for controlling the movements of the ram and varying its pressure upon the working stroke; and automatic means to operate the brakes for limiting the extent of the return stroke of the ram.

5. In a power press, a ram provided with a shank threaded for a portion of its length; an internally threaded bushing engaging the threaded portion of said presser shank; a bushing engaging the unthreaded portion of the shank, formed to permit the shank to slide through it longitudinally and fixed to rotate with the shank; means rotatably supporting said bushings and holding them against endwise movement; a gear fixed to the threaded bushing to rotate with it; a gear fixed to the other bushing to rotate therewith; a differential gear mechanism; a shaft operatively connected to one side of said differential mechanism; a gear fixed to rotate with said shaft and meshing with the gear upon the threaded bushing; a second shaft operatively connected to the opposite side of the differential mechanism; a gear fixed to rotate with said second shaft and meshing with the gear upon the other bushing; a friction brake to operate upon the first shaft; a friction brake to operate upon the second shaft; means operable at will to release the first brake and apply the second brake for rotating the threaded bushing, holding the other bushing against rotation and causing the ram to make a longitudinal working stroke; means operable after the release of said last means to apply the first brake and release the second brake for causing a return stroke of the ram; and means automatically operated by the return movement of the ram to release the first brake, apply the second brake and limit the return stroke.

6. In a power press, a ram provided with a shank threaded for a portion of its length; an internally threaded bushing engaging the threaded portion of said shank; a bushing engaging the unthreaded portion of the shank, fixed to rotate with the latter and formed to permit it to slide therethrough; means rotatably supporting said bushings and holding them against endwise movement; a driving connection for rotating the threaded bushing; a driving connection for rotating the other bushing; driving means to independently drive said driving connections and thereby move the ram upon a working stroke and upon a return stroke; and means to control said stroke movements.

7. In a power press, a ram threaded for a portion of its length; an internally threaded bushing engaging the threaded portion of the ram; a bushing engaging the unthreaded portion of the ram fixed to rotate with the latter and formed to permit it to slide therethrough; means rotatably supporting said bushings and holding them against endwise movement; a driving connection for rotating said threaded bushing; a driving connection for rotating the other bushing; a friction brake to control the rotation of the threaded bushing; and a friction brake to control the rotation of the other bushing.

8. A power press comprising a reciprocable ram; rotatable means for moving the ram on its working stroke; rotatable means for moving the ram on its return stroke; a differential gear mechanism connected to said two rotatable means to rotate them independently; a friction brake for locking the ram-returning means to cause a working stroke; a friction brake for locking the means for moving the ram on its working stroke to cause a return stroke; and means for simultaneously alternating the operation of the two brakes.

9. A power press comprising a reciprocable ram; rotatable means for moving the ram on its working stroke; rotatable means for rotating the ram and moving it on its return stroke; a differential gear mechanism connected to said two rotatable means to rotate them independently; a friction brake for locking the ram-returning means to cause a working stroke; a friction brake for locking the means for moving the ram on its working stroke to cause a return stroke; and means for simultaneously alternating the operation of the two brakes to hold the ram against rotation on its working stroke and to cause it to rotate on its return stroke.

10. A power press comprising a reciprocable ram; rotatable means for moving the ram on its working stroke; rotatable means for moving the ram on its return stroke; means for independently and differentially driving said two rotatable means whereby the ram will be moved at a greater speed on its return stroke than on its working stroke; a friction brake for the ram-returning mechanism; a friction brake for the mechanism for moving the ram on its working stroke; and means for simultaneously alternating the operation of the two brakes.

11. A power press comprising a reciprocable ram; rotatable means for moving the ram on its working stroke; rotatable means for moving the ram on its return stroke; a differential gear mechanism connected to said two rotatable means; a friction brake for locking the ram-returning means; a friction brake for locking the means for moving the ram on its working stroke; means for simultaneously alternating the operation of the two brakes; and means operated by the ram on its return stroke to arrest the operation of the ram-returning mechanism.

12. A power press comprising a reciprocable ram; rotatable means for moving the ram on its working stroke; rotatable means for moving the ram on its return stroke; a differential gear mechanism connected to said two rotatable means to rotate them independently; means to lock the ram-returning mechanism during the working stroke of the ram; and means to lock the mechanism for moving the ram on its working stroke during the return movement of the ram.

13. A power press comprising a reciprocable ram; rotatable means for moving the ram on its working stroke; rotatable means for moving the ram on its return stroke; a differential gear mechanism connected to said two rotatable means to rotate them independently; means for simultaneously locking the ram returning mechanism and releasing the mechanism for driving the ram on its working stroke and for simultaneously locking the mechanism for moving the ram on its working stroke and releasing the mechanism for moving the ram on its return stroke.

14. A power press comprising a reciprocable ram; rotatable means for moving the ram on its working stroke; rotatable means for moving the ram on its return stroke; a differential gear mechanism connected to said two rotatable means; means for simultaneously locking the ram-returning mechanism and releasing the mechanism for driving the ram on its working stroke and for simultaneously locking the mechanism for moving the ram on its working stroke and releasing the mechanism for moving the ram on its return stroke; and means operated by the ram for arresting the movement of the ram-returning mechanism and simultaneously releasing the mechanism for moving the ram on its working stroke.

15. A power press comprising a reciprocable ram; rotatable means for moving the ram on its working stroke; rotatable means for moving the ram on its return stroke; a differential gear mechanism connected to said two rotatable means; means for simultaneously locking the ram-returning mechanism and releasing the mechanism for driving the ram on its working stroke and for simultaneously locking the mechanism for moving the ram on its working stroke and releasing the mechanism for moving the ram on its return stroke; and means operated by the ram for arresting the movement of the ram-returning mechanism.

16. In a mechanical tool apparatus, a tool-holding member threaded for a portion of its length; an internally threaded bushing engaging the threaded portion of said tool holder; a bushing engaging the unthreaded portion of the holder fixed to rotate with the latter and formed to permit it to slide therethrough; means rotatably supporting said bushings and holding them against endwise movement; a driving connection for rotating said threaded bushing; a driving connection for rotating the other bushing; a friction brake to control the rotation of the threaded bushing; and a friction brake to control the rotation of the other bushing.

17. In a mechanical tool apparatus, a reciprocable tool-holding member; rotatable means for moving said tool holder on its working stroke; rotatable means for moving the holder upon its return stroke; mechanism connected to said two rotatable means to rotate them differentially; a brake to lock the means for moving the holder upon its working stroke; a brake to lock said holder-returning means; and means operated by the holder upon its return stroke to automatically release the first brake and apply the second brake to limit the return stroke.

18. In a mechanical tool apparatus; a reciprocable tool-holding member; rotatable means for moving said tool holder on its working stroke; rotatable means for moving the holder upon its return stroke; mechanism connected to said two rotatable means to rotate them independently; a brake to lock the means for moving the holder upon its working stroke; a brake to lock said holder-returning means; and means operated by the holder upon its return stroke to automatically apply the second brake to limit the return stroke.

19. In a mechanical tool apparatus, a reciprocable tool-holding member; rotatable means for moving said tool holder on its working stroke; rotatable means for moving the holder on its return stroke; mechanism connected to said two rotatable means to rotate them independently; a brake to lock the means for moving the holder upon its working stroke; a brake to lock said holder-returning means; foot-operated means to release the first brake and apply the second to cause a working stroke of the holder; and means to automatically apply the first brake and release the second brake to cause a return stroke of the holder when the foot-operated means is released.

20. In a mechanical tool apparatus, a reciprocable tool-holding member; rotatable means for moving said tool holder on its working stroke; rotatable means for moving the holder on its return stroke; mechanism connected to said two rotatable means to rotate them independently; a brake to lock the means for moving the holder upon its working stroke; a brake to lock said holder-returning means; foot-operated means to release the first brake and apply the second to cause a working stroke of the holder; means to automatically apply the first brake and release the second to cause a return stroke of the holder when the foot-operated means is released; and means operated by the holder upon its return stroke to automatically release the first brake and apply the second brake to limit the return stroke.

21. In a mechanical tool apparatus, a reciprocably mounted tool-holding member; a differential gear mechanism; a drive element operatively connected to said mechanism; a driving connection between one side of the differential mechanism and said tool holder to move the latter on a working stroke; a driving connection between the other side of the differential mechanism and the tool holder to move the latter on a return stroke; a brake to control said working stroke driving connection; a brake to control said return stroke driving connection; and means to alternately operate said brakes to cause reciprocation of the holder by the differential mechanism and said driving connections and vary at will the pressure of the tool holder on its working stroke.

22. In a mechanical tool apparatus; a reciprocably mounted tool-holding member; rotatable tool-advancing means for moving said tool holder on its working stroke; rotatable tool-retracting means for moving said tool holder on its return stroke; a differential gear mechanism; a driving connection between one side of said differential mechanism and the tool-advancing means; a driving connection between the opposite side of the differential mechanism and the tool-retracting means; means to lock the said tool-advancing means to cause it to co-operate with the tool-retracting means; means to lock the said tool-retracting means to cause it to co-operate with the said tool-advancing means; and means for simultaneously alternating the locking of one and the releasing of the other of said two locking means, and varying at will the pressure of the tool holder on its working stroke.

23. In a mechanical tool apparatus, a reciprocably mounted tool-holding member; rotatable means for moving said tool holder on a working stroke; rotatable means for moving the holder on a return stroke; a differential gear mechanism; a driving connection between one side of said differential mechanism and the tool-advancing means; a driving connection between the opposite side of the differential mechanism and the tool-retracting means; means to lock the means for moving the holder on a return stroke and co-operate with the mechanism to cause a working stroke; means to lock the means for moving the holder on a working stroke and co-operate with the driving mechanism to cause a return stroke; means for simultaneously alternating the operation of the two locking means; and means to automatically apply the first locking means and release the second locking means to limit the return stroke of the holder.

24. In a mechanical tool apparatus; a reciprocably mounted tool-holding member; rotatable tool-advancing means for moving said tool holder on its working stroke; rotatable tool-retracting means for moving said tool holder on its return stroke; a differential gear mechanism; a driving connection between one side of said differential mechanism and the tool-advancing means; a driving connection between the opposite side of the differential mechanism and the tool-retracting means; means to lock the said tool-advancing means to cause it to co-operate with the tool-retracting means; means to lock the said tool-retracting means to cause it to co-operate with the said tool-advancing means; manually operable means for locking the tool-retracting means and releasing the tool-advancing means and varying at will the pressure of the tool holder on its working stroke; and means operating automatically upon the release of the said manually operable means to lock the tool-advancing means and to release the tool-retracting means.

25. In a mechanical tool apparatus, a reciprocably mounted tool-holding member; rotatable tool-advancing means for moving said tool holder on its working stroke; rotatable tool-retracting means for moving said tool holder on its return stroke; a differential gear mechanism; a driving connection between one side of said differential mechanism and said tool-advancing means; a driving connection between the opposite side of the differential mechanism and said tool-retracting means; means to lock the said tool-advancing means to cause it to co-operate with the tool-retracting means; means to lock the said tool-retracting means to cause it to co-operate with the said tool-advancing means; manually operable means for locking the tool-retracting means and releasing the tool-advancing means and varying at will the pressure of the tool holder on its working stroke; means operating automatically upon the release of the said manually operable means to lock the tool-advancing means and to release the tool-retracting means; and means adapted to be operated by the tool holder on its return stroke to automatically lock the tool-retracting means and release the tool-advancing means to limit the return stroke of the tool holder.

26. In a mechanical tool apparatus, a reciprocably mounted tool-holding member; a differential gear mechanism; a drive element operatively connected to said mechanism; a driving connection between the differential mechanism and said tool holder to move the latter on a working stroke; a driving connection between the differential mechanism and the tool holder to move the latter on a return stroke; brake means for controlling said working stroke driving connection; brake means for controlling said return stroke driving connection; means for alternately operating said two brake means to cause reciprocation of the holder by the differential mechanism and said driving connections; and means whereby the tool holder will be retracted at a higher speed than its movement on its working stroke.

27. In a mechanical tool apparatus, a reciprocably mounted tool holding member; a differential driving mechanism; a driving connection between one side of said differential mechanism and the tool holder to shift the latter upon a working stroke; a driving connection between the opposite side of the differential mechanism and the tool holder to shift the latter upon a return stroke; brake means to control said working stroke driving connection; brake means to control said return stroke driving connection; means to alternately operate said two brake means to cause the tool holder to reciprocate; and means to cause the tool holder to rotate upon one of its strokes.

28. In a mechanical tool apparatus, a reciprocably mounted tool-holding member; a differential driving mechanism; a driving connection between one side of said differential mechanism and the tool holder to shift the latter upon a working stroke; a driving connection between the opposite side of the differential mechanism and the tool holder to shift the latter upon a return stroke; brake means to control said working stroke driving connection; brake means to control said return stroke driving connection; means to alternately operate said two brake means to cause the tool holder to reciprocate; and means to automatically release the first brake means and apply the second brake means to limit the return stroke of the tool holder.

29. In a mechanical tool apparatus, a reciprocably mounted tool-holding member; a differential gear mechanism; a drive element operatively connected to said mechanism; a driving connection between the differential mechanism and said tool holder to move the latter on a working stroke; a driving connection between the differential mechanism and the tool holder to move the latter on a return stroke; brake means for controlling said working stroke driving connection; brake means for controlling said return stroke driving connection; means for alternately operating said two brake means to cause reciprocation of the holder by the differential mechanism and said connections; and means operated by the tool holder upon its return stroke to apply said second brake means and release said first brake means to limit the return stroke of the holder.

30. A power press comprising a reciprocable ram; a differential gear mechanism; a driving connection between one side of the differential mechanism and said ram to move the ram on its working stroke; a driving connection between the opposite side of the differential gear mechanism and the ram to move the ram on its return stroke; a brake to control said working stroke driving connection; a brake to control said return stroke driving connection; a manually operable operating lever; operative connections between said lever and the brakes to release the first brake and apply the second brake when the lever is manually rocked in one direction and apply the first brake and release the second brake when the lever is rocked in the opposite direction; means to automatically rock the lever in said opposite direction when it is manually released; a pivoted member rockable by the ram upon its return stroke; and an operative connection between said pivoted member and said brake operating connections to release the first brake and apply the second brake to limit the return stroke of the ram when the pivoted member is rocked by the ram.

In testimony whereof we hereunto affix our signatures this 9th day of December, 1927.

ROBERT THOMSON.
ALFRED MORRIS THOMSON.